United States Patent [19]

Bello

[11] 3,825,796

[45] July 23, 1974

[54] CRT GEOMETRY CORRECTION NETWORK

[75] Inventor: Vincent G. Bello, Norwalk, Conn.

[73] Assignee: United Aircraft Corporation, East Hartford, Conn.

[22] Filed: Jan. 26, 1973

[21] Appl. No.: 326,633

Related U.S. Application Data

[63] Continuation of Ser. No. 155,094, June 21, 1971, abandoned.

[52] U.S. Cl. .......... 315/27 GD
[51] Int. Cl. .......... H01j 29/70
[58] Field of Search .......... 315/24, 27 GD, 27 R, 28, 315/29, 27 TD, 18, 22; 235/198

[56] References Cited

UNITED STATES PATENTS 3,422,306 1/1969 Gray .......... 315/27 GD
3,517,252 6/1970 Williams, Jr. .......... 315/24

*Primary Examiner*—Maynard R. Wilbur
*Assistant Examiner*—J. M. Potenza
*Attorney, Agent, or Firm*—M. P. Williams

[57] ABSTRACT

Geometry distortion, caused by the radius of curvature of the face of a CRT being larger than the axial distance of the CRT beam source to the CRT face, is corrected by a network which is an implementation of the precise mathematical relationships which describe the correction of the geometry distortion. A nonlinear network is used to generate correction signals which are subtracted from the uncorrected deflection signals, thereby providing corrected deflection signals.

1 Claim, 2 Drawing Figures

INVENTOR
VINCENT G. BELLO
BY Melvin P. Williams
ATTORNEY

PATENTED JUL 23 1974

3,825,796

SHEET 2 OF 2

CRT GEOMETRY CORRECTION NETWORK

This is a continuation of application Ser. No. 155,094, filed June 21, 1971, now abandoned.

BACKGROUND OF THE INVENTION

1. Field of Invention

This invention relates to cathode ray tube deflection circuitry and more particularly to circuitry for correcting the geometric distortion which is inherent in linear cathode ray tube displays using magnetic yoke deflection.

2. Description of the Prior Art

The objective of a linear cathode ray tube display is to produce a spot on the tube, displaced horizontally and vertically from the center of the tube, at a distance linearly proportional and responsive to horizontal and vertical deflection signals, respectively. It has long been known that this ideal displacement of the spot on the face of the tube, in response to deflection signals and in the absence of correction means, is only achieved when the face of the tube is spherical and the source of the spot, an electron beam source, is located at the center of the sphere defined by the tube face; in other words, when the radius of deflection is equal to the radius of curvature of the cathode ray tube. This ideal geometry, however, is rarely found in practice because it is desirable to have a flattened cathode ray tube face and to keep the distance from the electron beam source to the tube face as short as possible in order to keep the length of the tube small and still have a large display area upon the face of the tube. Usually, a cathode ray tube has a flat face or has a face with a radius of curvature very much larger than the ideal deflection radius of a linearly responsive deflection system. With the more usual geometry and in the absence of correction means, displacements near the edges of the tube are greater than displacements near the center of the tube, for equal increments of deflection signals. This type of distortion has been referred to in the prior art as "pincushion distortion" or "geometry distortion."

In the prior art, a plethora of solutions to the geometry distortion problem have been proposed. Heretofore, field correction coils or permanent magnets have been placed around the periphery of the magnetic deflection yoke as a corrective measure. Corrective schemes of this type are difficult to implement and are most often either not entirely effective or cause other forms of distortion known to the prior art as "cupid's bow" and "barrelling." For raster swept displays, networks have been used that predistort sweep signals in the shape of an "S" curve. This correction technique is effective in reducing geometry distortion but usually has no application to a display employing a stroke write generator. In one of the correction schemes known in the prior art, the technique of predistorting orthogonal deflection signals, similar to that disclosed in U.S. Pat. No. 3,422,306 to Gray has general application to all cathode ray tube displays using magnetic deflection. The Gray patent discloses a circuit which predistorts the deflection signals of the cathode ray tube in conformity with correction equations. Gray's patent, however, discloses a circuit which is only approximate in its correction of geometry distortion since the equation from which the circuit is modelled is only approximate. A precise mathematical relationship describing the correction of deflection signals to achieve display linearity is known and is the subject matter of "Linearity Correction of Magnetic Deflection Cathode Ray Tube" by A. E. Popodi in *Electrical Design News*, January, 1964.

Therefore, means for correcting geometry distortion of magnetically deflected cathode ray tubes heretofore known in the art, are either difficult to use, ineffective, are not applicable to stroke written displays or have a capability of only approximate correction.

SUMMARY OF THE INVENTION

An object of the present invention is to provide a circuit which predistorts each of two deflection signals so that geometry distortion of the cathode ray tube display is eliminated.

According to the present invention, each of a pair of corrected orthogonal cathode ray tube deflection signals, referred to herein (for simplicity only) as horizontal and vertical, is desired as the difference between the uncorrected signal and a related correction signal which in turn is the product of the uncorrected signal and a common correction signal which is a nonlinear monotonic function of the sums of the weighted squares of both uncorrected signals.

Predistortion of the deflection signals is accomplished by the invention in a more precise manner and less subject to error than by means heretofore known, because the invention is an analog of the mathematical relationship describing the required correction. The generation and the subtraction of a signal from the uncorrected deflection signal is done by circuitry which is more stable than geometry correction circuits known to the prior art.

Other objects, features and advantages of the present invention will become more apparent in the light of the following detailed description of a preferred embodiment thereof, as illustrated in the accompanying drawing.

DESCRIPTION OF THE PREFERRED EMBODIMENT

Figure 1:
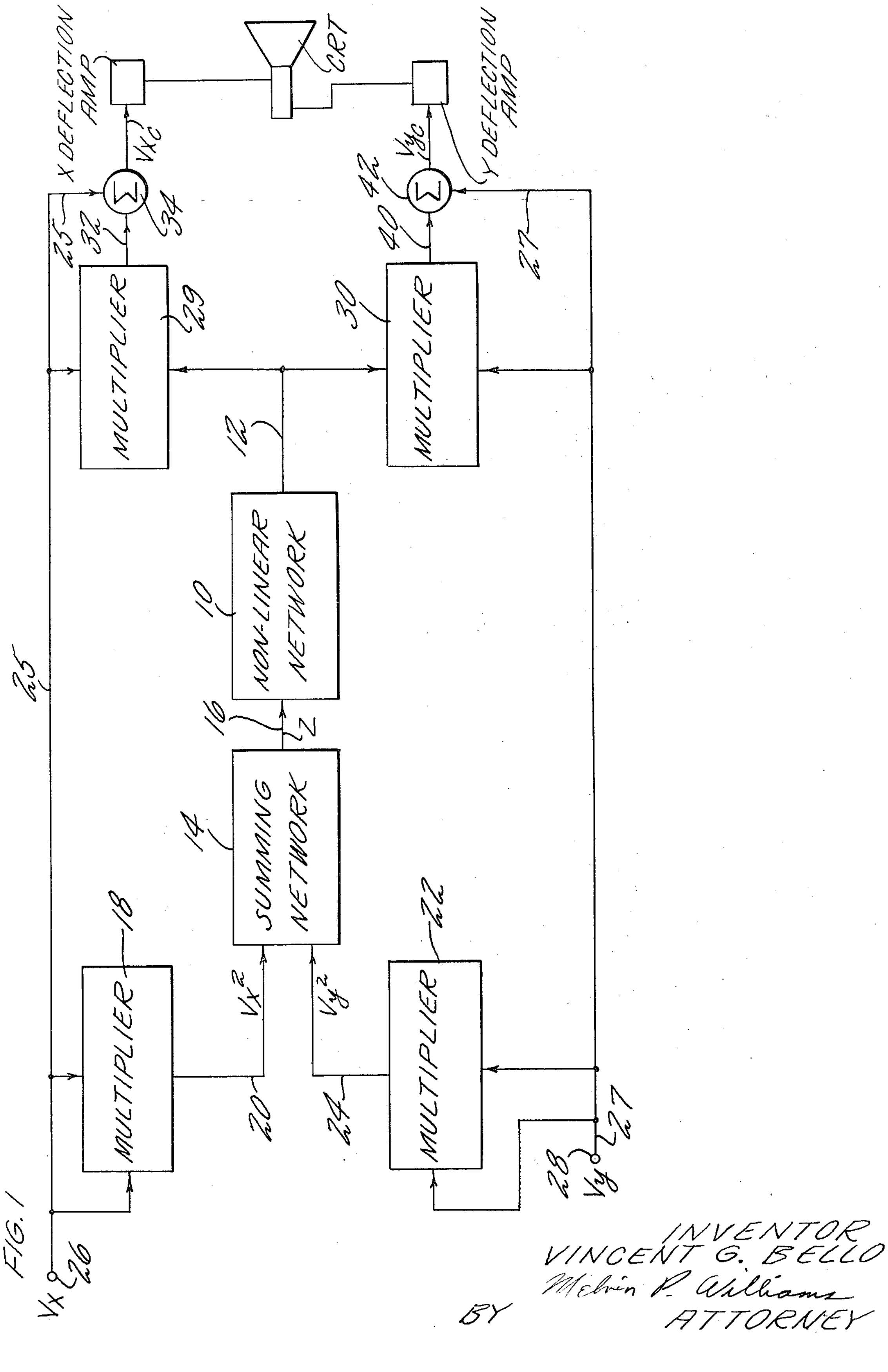
FIG. 1 is a block diagram of a preferred embodiment of the present invention.

In accordance with the invention, a precise mathematical relationship relating an uncorrected deflection signal to a corrected deflection signal in a cathode ray tube display using magnetic deflection is given as:

$$V_{xc} = V_x - V_x g(z) \tag{1}$$

$$V_{yc} = V_y - V_y g(z) \tag{2}$$

where $V_x$ and $V_y$ are uncorrected deflection signals corresponding to deflection upon the face of the CRT in the horizontal and vertical directions, respectively;

$V_{xc}$ and $V_{yc}$ are corrected deflection signals corresponding to deflections on the face of the CRT in the horizontal and vertical directions respectively;

$g(z)$ is a correction factor, given as, $$g(z) = 1 - \sqrt{1/2n^2 - 2n + 1 - 2(n-1)\sqrt{n^2 - z}} \quad (3)$$

where $z = a\,V_x^2 + b\,V_y^2$ (4)

$n$ = the ratio of the radius of curvature to the radius of deflection of the cathode ray tube, $$a = (\sin \alpha / V_{x\ max})^2 \quad (5)$$

$$b = (\sin \beta / V_{y\ max})^2 \quad (6)$$

where $\alpha$ = the uncorrected horizontal deflection angle associated with the maximum horizontal deflection of the CRT after correction $\beta$ = the uncorrected vertical deflection angle associated with the maximum vertical deflection of the CRT after correction $V_{x\ max}$ = the uncorrected horizontal deflection signal for producing a maximum corrected horizontal deflection $V_{y\ max}$ = the uncorrected vertical deflection signal for producing a maximum corrected vertical deflection.

$\alpha$ and $\beta$ are deflection angles that are not explicitly known because they correspond to angles that place the CRT beam off of the CRT. However, the relationship of $\alpha$ and $\beta$ to the maximum deflection angles of the CRT is given as, $$\sin \alpha = \sin A\,[-(n-1)\cos A + \sqrt{(n-1)^2 \cos^2 A + 2n - 1}] \quad (7)$$

$$\sin \beta = \sin B\,[-(n-1)\cos B + \sqrt{(n-1)^2 \cos^2 A + 2n - 1}] \quad (8)$$

where $A$ = the maximum horizontal deflection angle of the CRT $B$ = the maximum vertical deflection angle of the CRT These parameters are described more fully in the aforementioned Popodi article.

A nonlinear circuit providing a signal proportional to the correction factor, $g(z)$, has an input signal proportional to the variable, $z$, which is a sum of the weighted squares of the uncorrected deflection signals. Since $g(z)$ is small and the product terms which are subtracted from the uncorrected deflection signals are also small, the geometry correction network is not sensitive to a lack of precision in the construction of the nonlinear circuit.

Referring now to FIG. 1, a nonlinear network 10 provides a signal level proportional to $g(z)$ on a signal line 12. The input to the nonlinear network 10 is a signal proportional to the variable $z$, provided by a summing network 14 on a signal line 16. As the equation for $z$ given hereinbefore indicates, z is proportional to the sum of the squares of the uncorrected deflection signals, each of which is weighted by a constant, each of the constants being associated with the geometry of the particular cathode ray tube being used. The summation and the weighting of the signals is done by the summing network 14. A multiplier 18 provides a signal proportional to $V_x^2$ (the square of the uncorrected horizontal deflection signal) on a signal line 20, and a multiplier 22 provides a signal proportional to $V_y^2$ (the square of the uncorrected vertical deflection signal) on a signal line 24. The uncorrected deflection signal, $V_x$, is applied to a terminal 26 which is connected by a line 25 to both of the inputs of the multiplier 18 and similarly, the uncorrected vertical deflection signal, $V_y$, is applied to a terminal 28 which is connected by a line 27 to both of the inputs of the multiplier 22.

The signal proportional to $g(z)$ on the line 12 is applied to one of two inputs of a multiplier 29 and one of two inputs of a multiplier 30. The uncorrected horizontal and vertical deflection signals on lines 25 and 27 are connected to the other inputs of the multipliers 29, 30, respectively. A horizontal correction signal equal to $V_x\,g(z)$ is provided by the output of the multiplier 29 on the signal line 32. According to the equations, the corrected horizontal deflection signal is produced in a summing unit 34 by subtracting the signal on the line 32 from the uncorrected horizontal deflection signal $V_x$ on the line 25. In a completely analogous manner, a vertical correction signal equal to $V_y\,g(z)$ is provided by the output of the multiplier 30 on a signal line 40, and the corrected vertical deflection signal is produced in a summing unit 42 by subtracting the signal on the line 40 from the uncorrected vertical deflection signal $V_y$ on the line 27.

In this embodiment of the invention, the nonlinear network 10 is comprised of diodes and resistors constructed to have a transmission characteristic that produces the desired correction signal. In the equation, if the variable $z$ is equal to zero, $g(z)$ is also equal to zero; and as $z$ increases, $g(z)$ increases. This monotonic property of the correction factor facilitates the construction of a circuit closely approximating the desired transmission characteristic.

Figure 2:
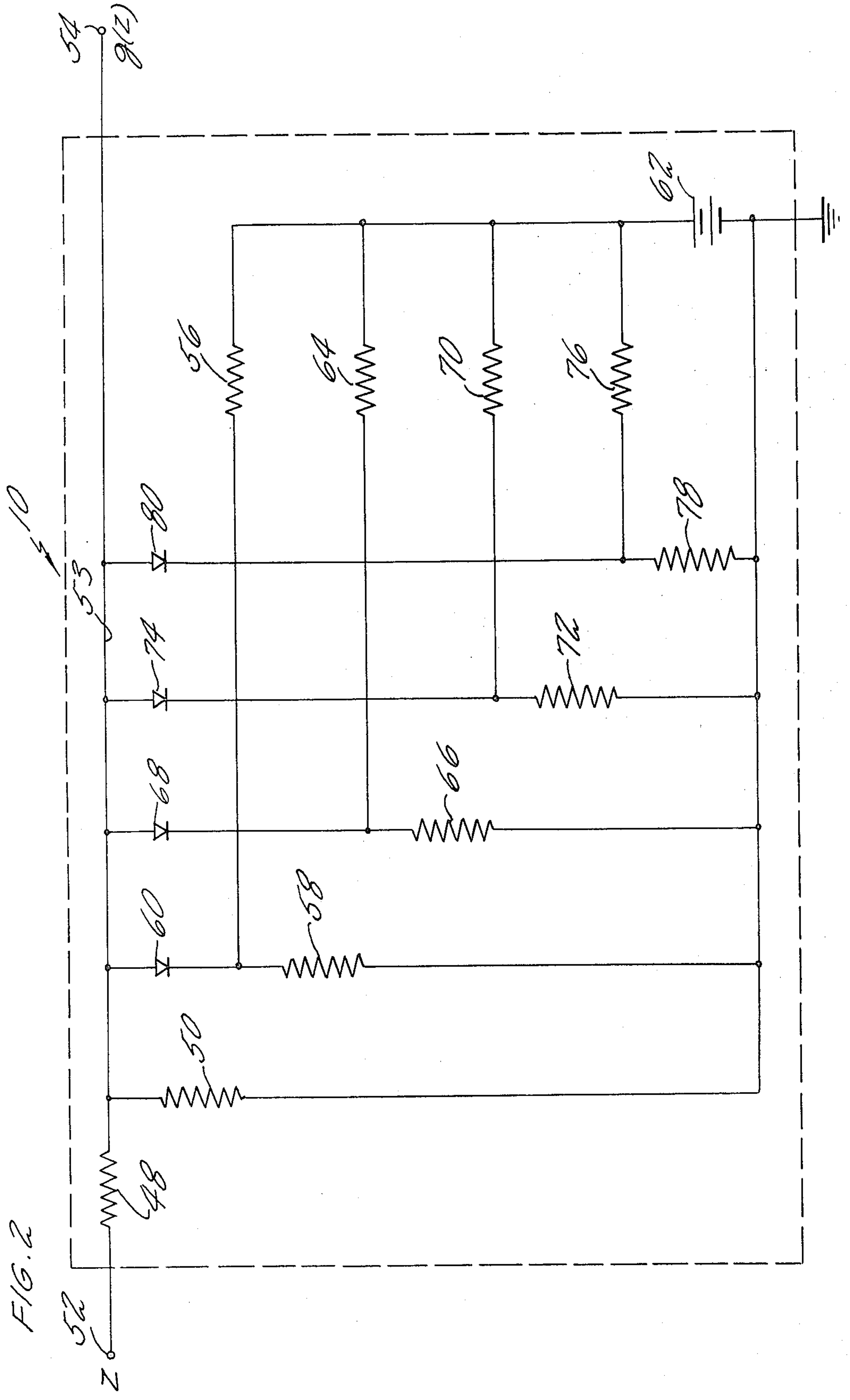
FIG. 2 is a schematic diagram of a nonlinear network used in the embodiment of FIG. 1.

Referring now to FIG. 2, the nonlinear circuit 10 for approximating the desired transmission characteristic and thereby producing correction signals is shown to comprise five voltage dividers and a bias source which are driven by a signal proportional to the variable $z$ provided to the divider at a terminal 52 by the line 16 (FIG. 1). The first voltage divider consists of a resistor 48 and a resistor 50. The output of the divider at the junction of the resistors 48, 50 is connected by a line 53 to a terminal 54 where a signal is generated which is proportional to the correction factor g(z) and applied to the line 12 (FIG. 1). A second voltage divider consists of a pair of resistors 56, 58 connected across a DC bias source 62, with their junction connected through a diode 60 to the line 53. The resistor 56 is connected to the positive terminal of the DC bias source 62 and the resistor 58 is connected to the negative side of the DC bias source 62. Increasing the signal level at the terminal 52 so that the voltage on the line 53 becomes approximately equal to the voltage at the cathode of the diode 60 causes the diode 60 to conduct and thereby alter the network 10 in the required nonlinear manner. The bias voltage of the diode 60 provided at the junction of the resistors 56, 58 is referred to as a network breakpoint. Other breakpoints are provided by:

a voltage divider comprised of resistors 64, 66 and a diode 68; a voltage divider comprised of the resistors 70, 72 and a diode 74; and a voltage divider comprised of resistors 76, 78 and a diode 80. The breakpoints provided by the voltage dividers are chosen so that a circuit having a piecewise transmission characteristic, approximating the desired transmission characteristic, is obtained. The resistor values and the voltage of the DC bias source 62 are determined, for each CRT, by utilizing well-known network theory to implement equation (3), hereinbefore.

Thus the present invention differs from prior art circuits of the type shown in the Gray patent, supra, in that the common correction signal is generated on line 12 herein in response to a nonlinear function of the sum of weighted squares, whereas Gray uses simply the sum of unweighted squares, unmodified by a nonlinear function.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. A cathode ray tube magnetic deflection circuitry for providing, to a cathode ray tube, deflection signals corrected for geometry distortion in response to uncorrected horizontal and vertical deflection signals, comprising:

means providing a signal proportional to the sum of the weighted squares of said uncorrected deflection signals;

a nonlinear, biased diode-resistor breakpoint network responsive to said sum of the weighted squares signal, wherein the bias and resistor values are selected to provide breakpoints of said nonlinear network so that it is responsive to said sum of the weighted squares, $z$, to provide a common correction signal $g(z)$ substantially in accordance with the relationship, $$g(z) = 1\ \sqrt{2n^2 - 2n + 1 - 2(n-1)\ \sqrt{n^2 - z}}$$

where $n$ = the ratio of the radius of curvature to the radius of deflection of the cathode ray tube, and $z$ = said sum of the weighted squares of said uncorrected deflection signals;

means for providing a horizontal correction signal proportional to the product of said uncorrected horizontal deflection signal and said common correction signal, and for providing a vertical correction signal proportional to the product of said uncorrected vertical deflection signal and said common correction signal; and means for providing a corrected horizontal deflection signal proportional to the difference of said uncorrected horizontal deflection signal and said horizontal correction signal, and for providing a corrected vertical deflection signal proportional to the difference of said uncorrected vertical deflection signal and said vertical correction signal.

* * * * *

UNITED STATES PATENT OFFICE
CERTIFICATE OF CORRECTION

Patent No. 3,825,796 Dated July 23, 1974

Inventor(s) Vincent G. Bello

It is certified that error appears in the above-identified patent and that said Letters Patent are hereby corrected as shown below:

Column 3, line 1 , equation (3) should appear as shown below:

$$g(z) = \frac{1}{\sqrt{2n^2 - 2n + 1 - 2(n-1)\sqrt{n^2 - z}}}$$

Signed and sealed this 12th day of November 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
U.S. GOVERNMENT PRINTING OFFICE 869-930